United States Patent [19]

Stokes

[11] 4,334,565

[45] Jun. 15, 1982

[54] TIRE INSERT

[75] Inventor: Leonard S. Stokes, Mt. Clemens, Mich.

[73] Assignee: Uniroyal, Inc., New York, N.Y.

[21] Appl. No.: 162,972

[22] Filed: Jun. 25, 1980

Related U.S. Application Data

[63] Continuation of Ser. No. 884,656, Mar. 8, 1978, abandoned.

[51] Int. Cl.$^3$ .............................................. B60C 17/04
[52] U.S. Cl. ..................................... 152/158; 152/313; 152/330 RF
[58] Field of Search .......................... 152/155, 157–158, 152/152, 310–314, 330 RF, 349–350

[56] References Cited

U.S. PATENT DOCUMENTS

| | | | |
|---|---|---|---|
| 3,250,310 | 5/1966 | Johnson | 152/158 |
| 3,854,516 | 12/1974 | Burnell | 152/330 RF |
| 3,935,892 | 2/1976 | Arimura et al. | 152/330 RF |
| 3,949,796 | 4/1976 | Bartos | 152/158 |
| 3,996,985 | 12/1976 | Cady et al. | 152/330 RF |
| 4,003,419 | 1/1977 | Verdier | 152/330 RF |
| 4,008,743 | 2/1977 | Welch | 152/158 |
| 4,071,386 | 1/1978 | Gomberg | 152/330 RF |

Primary Examiner—Edward C. Kimlin
Assistant Examiner—Lois E. Boland
Attorney, Agent, or Firm—Philip Rodman

[57] ABSTRACT

A toroidal insert for an inflated, tubeless, pneumatic tire. The insert comprises a preformed torus-like core, tire cord radially wound around the torus-like core, and at least one load bearing member having tire cord therein, said member being circumferentially wound around substantially the middle one third of the radially outer surface of the radially wound tire cord. The insert, when situated within the inflated tire, includes a cross-section having a thick, substantially oval, central portion extending between the beads of the inflated tire and a pair of thin end portions each extending from its respective side of the thick, oval, central portion along the adjacent sidewall of said inflated tire to about the midpoint of said adjacent sidewall, whereby, when the tire is deflated, the thick, oval, central portion of the insert supports the tread portion of the deflated tire and each of the thin end portions of the insert lies between and supports the adjacent, collapsed sidewall of the deflated tire.

9 Claims, 6 Drawing Figures

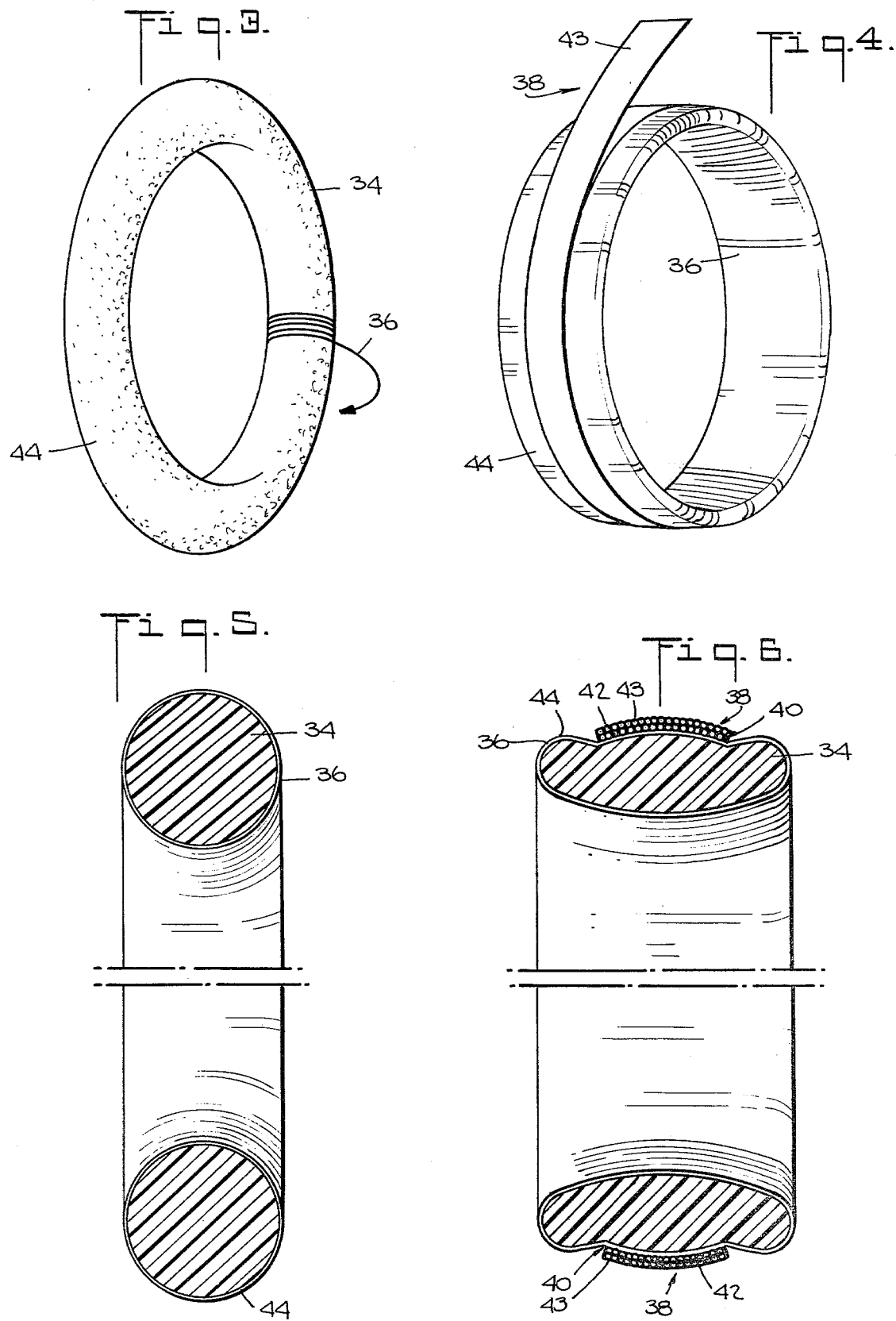

TIRE INSERT

This is a continuation of application Ser. No. 884,656, filed Mar. 8, 1978, now abandoned.

BACKGROUND OF THE INVENTION

The instant invention relates to a run-flat, tubeless, pneumatic tire and more particularly to a toroidal, reinforced insert for such a run-flat tire.

Flat tires or tires with minimum inflation have long posed serious problems for drivers of vehicles equipped with pneumatic tires. Flat tires usually require that they be changed before the vehicle can proceed, and such a change requires that there be a spare tire situated somewhere on the vehicle, usually in the trunk of a car. A spare tire consumes valuable storage space, and it has therefore become an objective of the automobile and tire industries to provide a tire which would be able to perform, although at reduced speeds, in a flat condition so that the vehicle may be able to proceed to a service center and obtain permanent repairs or replacement, thereby eliminating the need for a spare tire.

There have been many prior art attempts to provide a run-flat tire utilizing inserts in the cavity created by the tire and wheel rim. However, none of these attempts has met with commercial success. The reasons for the failures of the prior art inserts consist of one or more of the following:

1. The insert has proved too difficult to install.
2. The insert, such as a solid rubber buffer, takes up too much enclosed air space and prevents the iron rim from radiating heat from the enclosed air caused by tire flexing, especially at high speed, and the resulting high temperature of enclosed air melts the rubber and vulcanization of the enclosing tire, causing the enclosing tire to wear out in a few hundred or less miles.
3. The insert, such as a steel buffer, though it would run cool, would be too rigid and would bend permanently and cut through the enclosed tire casing if, for example, it were run over a steel railroad rail.

The instant invention overcomes the aforementioned problems of the prior art by providing a novel insert structure for a pneumatic tire.

SUMMARY OF THE INVENTION

Accordingly, the instant invention provides a toroidal insert for an inflated, tubeless, pneumatic tire. The insert comprises a torus-like core, tire cord radially wound around the core, and at least one load bearing member having tire cord therein, said member being circumferentially wound around substantially the middle one third of the radially outer surface of the radially wound tire cord. The insert, when situated within the inflated tire, includes a cross-section having a thick, substantially oval, central portion extending between the beads of the inflated tire and a pair of thin end portions each extending from its respective side of the thick, substantially oval, central portion along the adjacent sidewall of said inflated tire to about the midpoint of said adjacent sidewall, whereby, when the tire is deflated, the thick, substantially oval, central portion of the insert supports the tread portion of the deflated tire and each of the thin end portions of the insert lies between and supports the adjacent, collapsed sidewall of the deflated tire.

BRIEF DESCRIPTION OF THE DRAWINGS

FIG. 3 is a perspective view showing the torus-like core of the insert being radially wound by tire cord;

FIG. 4 is a perspective view of the insert after it is radially wound and in the process of being circumferentially wound;

FIG. 5 is an axial, sectional view of the core shown in FIG. 3 but after the core has been completely radially wound;

FIG. 6 is an axial, sectional view of the insert shown in FIG. 4 but after the insert has been completely circumferentially wound.

DESCRIPTION OF THE PREFERRED EMBODIMENT

Figure 1:
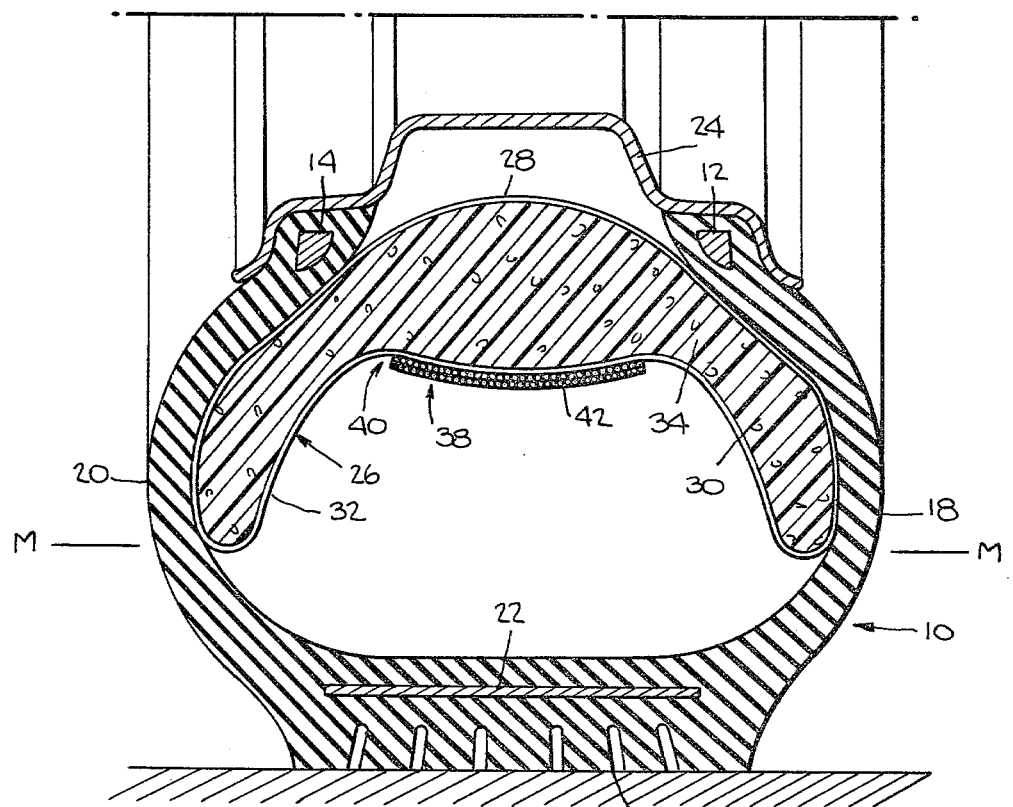
FIG. 1 is a vertical, sectional view of an inflated, tubeless, pneumatic tire having a toroidal insert according to the instant invention.
Figure 2:
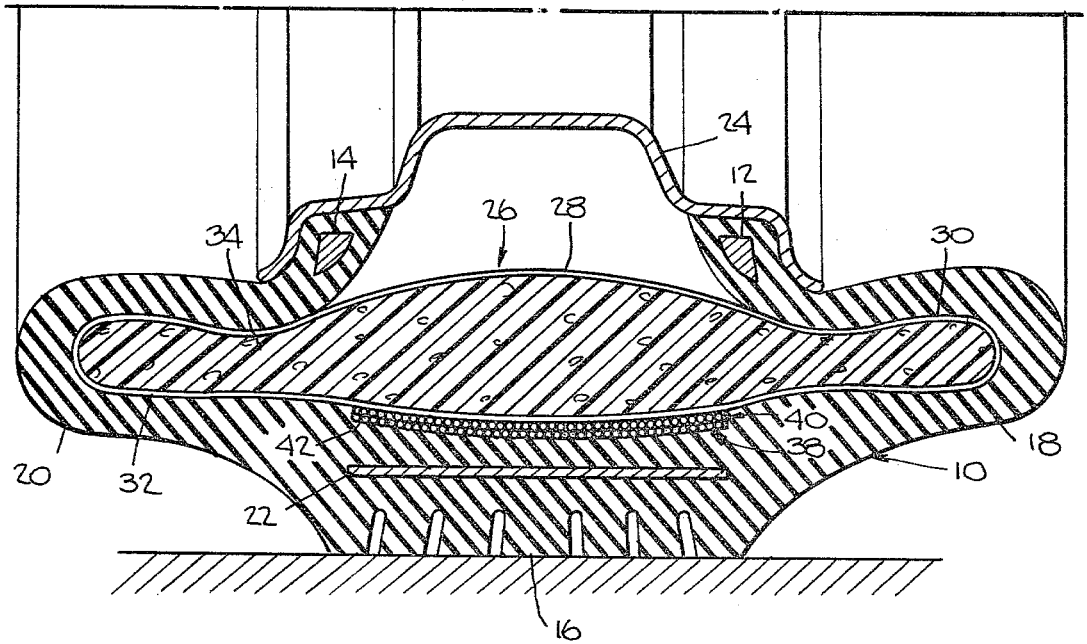
FIG. 2 is the same as FIG. 1 except that the tire is deflated and supported by the insert.

In describing the preferred embodiment of the instant invention, reference is made to the drawings, wherein there is seen in FIGS. 1 and 2 a tubeless, pneumatic tire 10 having a pair of beads 12 and 14, a tread portion 16, a pair of sidewalls 18 and 20, and a reinforcing belt 22. The tire 10 is mounted on a wheel rim 24.

A toroidal insert 26 is situated within the space defined by the tire 10 and the wheel rim 24. When the tire 10 is inflated, as seen in FIG. 1, the insert 26 includes a cross-section having a thick, substantially oval central portion 28 which extends between the beads 12 and 14 and a pair of thin end portions 30 and 32, each of which extends from its respective side of the substantially oval central portion 28 along the adjacent sidewall 18 and 20 respectively of the inflated tire 10 to about the midpoint M of the adjacent sidewall.

The insert 26 comprises a preformed torus-like core 34 (see FIG. 3) which may be formed from a cellular or foam material, tire cord 36 which is radially wound around the torus-like core 34, and two load bearing members 38 and 40 which consist of tire cord 42 encased in rubber 43. The load bearing members 38 and 40 are circumferentially wound around substantially the middle one third of the radially outer surface 44 of the radially wound tire cord 36 (see FIGS. 4 and 6). The tire cord 42 in the load bearing members 38 and 40 are preferably oriented at right angles to the radially wound tire cord 36. Although the load bearing members 38 and 40 are shown as being arcuate, in cross-section, said members may be wound so that they are essentially flat in cross-section. The term "substantially oval central portion" is intended to include both flat and arcuate windings of the load bearing members 38 and 40.

The torus-like core 34 is preferably formed from an open or closed celled foam, the most preferred foams being polyurethane and polyethylene. The preferred materials for the radially wound tire cord 36 are fiberglass, nylon, polyester, and steel wire, with steel wire being the most preferred. The preferred and most preferred materials for the tire cord 42 in the load bearing members 38 and 40 are the same as those for the radially wound tire cord 36, although in any given insert the same or different materials may be used to form the radially wound tire cord 36 and the load bearing member tire cord 42.

The preferred method of manufacturing the toroidal insert 26 comprises molding or cutting the foam core to the desired dimensions, winding radial cords around the foam core, and then wrapping circumferential cords around the circumference of the core at the proper diameter to compress the core sufficiently to provide the central portion 28 and the end portions 30 and 32.

In using the toroidal insert 26, one would first place the insert 26 within the unmounted tire 10 so that the central portion 28 and end portions 30 and 32 were aligned within the tire 10 substantially as shown in FIG. 1. The tire 10 and insert 26 are then mounted on the wheel rim 24 in conventional manner. The pneumatic tire 10 may then be inflated.

Should the pneumatic tire 10 deflate, as seen in FIG. 2, the thick, substantially oval, central portion 28 of the toroidal insert 26 supports the tread portion 16 of the deflated tire 10 and each of the end portions 30 and 32 of the insert 26 lies between and supports the adjacent, collapsed sidewall 18 and 20 respectively of the deflated tire 10. The insert 26 effectively stabilizes the tire 10 on the rim 24, reduces heat buildup and allows the vehicle to proceed.

The invention disclosed will have many modifications which will be apparent to those skilled in the art in view of the teachings of the specification. It is intended that all modifications which fall within the true spirit and scope of this invention be included within the scope of the appended claims.

What is claimed is:

1. A toroidal insert for a tubeless, pnuematic tire consisting of:
   a preformed, torus-like cellular or foam core having a central axis, a radially inner surface portion with respect to said central axis, a radially outer surface portion with respect to said central axis;
   tire cord radially wound around said core; and
   at least one belt-like load bearing member having tire cord therein, said belt-like member being wound around the outer diametrical surface portion of said torus-like core such that the insert, in cross-section, has a relatively thick, substantially oval middle portion and a pair of relatively thin leg portions each extending from a respective side of the substantially oval middle portion, said belt-like member surrounding said substantially oval middle portion but not extending into said leg portions.

2. The insert of claim 1, wherein the core is formed from polyurethane foam.

3. The insert of claim 1, wherein the radially wound tire cord comprises steel wire.

4. The insert of claim 3, wherein the tire cord in the belt-like load bearing member comprises steel wire.

5. The insert of claim 1, wherein the belt-like load bearing member is arcuate in cross-section.

6. The insert of claim 1, wherein the belt-like load bearing member is substantially flat in cross-section.

7. In combination, a tire rim, a tubeless pneumatic tire mounted on said rim, said tire having a tread and sidewalls, and a toroidal insert lying within and adjacent the sidewalls of said tire, said insert consisting of a preformed, torus-like cellular or foam core having a central axis, a radially inner surface portion with respect to said central axis, a radially outer surface portion with respect to said central axis, tire cord radially wound around said core, and at least one belt-like load bearing member having tire cord therein, said belt-like member being circumferentially wound around the radially outer surface portion such that the insert, in cross-section, has relatively thick, substantially oval middle portion extending between the beads of said tire and a pair of relatively thin leg portions each extending from a respective side of the substantially oval middle portion along a respective adjacent sidewall of said tire, to about the midpoint of said adjacent sidewall, said belt-like member surrounding said substantially oval middle portion but not extending into said leg portions and whereby, when the tire is deflated while supporting a rated load the tread and sidewalls collapse, with the substantially oval middle portion of the insert supporting the collapsed tread portion of the tire, and each of the leg portions of the insert lying between and supporting the adjacent, collapsed sidewalls of the tire.

8. The combination of claim 7, wherein the core is formed from a cellular material.

9. The combination of claim 7, wherein the radially wound tire cord comprises steel wire.

* * * * *